350-3.79

XR 3,914,544

United State

Watanabe et al.

[11] 3,914,544

[45] Oct. 21, 1975

[54] APPARATUS FOR HALOGRAPHICALLY RECORDING AND REPRODUCING PICTURE IMAGES ON A DISC

[75] Inventors: Hideo Watanabe, Hino; Yoshivuki Seki, Tokyo; Jikko Takeuchi, Koganei, all of Japan

[73] Assignee: Fuji Telecasting Co., Ltd., Tokyo, Japan

[22] Filed: Mar. 8, 1974

[21] Appl. No.: 449,347

Related U.S. Application Data

[63] Continuation of Ser. No. 251,911, May 10, 1972.

[52] U.S. Cl. .................. 178/6.8; 350/3.5; 350/193; 352/102

[51] Int. Cl.² ............................................ H04N 3/00

[58] Field of Search .............. 178/6, 6.8, 7.85, 7.88; 358/2; 350/3.5, 193, 189; 352/102, 103, 105, 107, 112

[56] References Cited

UNITED STATES PATENTS

| | | | |
|---|---|---|---|
| 3,610,722 | 10/1971 | Bestenreiner | 350/3.5 |
| 3,652,144 | 3/1972 | Lugt | 350/3.5 |
| 3,658,403 | 4/1972 | Greenbaum | 350/3.5 |
| 3,695,744 | 10/1972 | Clay | 350/3.5 |
| 3,746,783 | 7/1973 | Gerritsen | 178/6.8 |

*Primary Examiner*—Howard W. Britton
*Assistant Examiner*—Michael A. Masinick
*Attorney, Agent, or Firm*—Oblon, Fisher, Spivak, McClelland & Maier

[57] ABSTRACT

Images originally recorded on, for example, a film frame, a television frame or a field are arranged as holograms on a holographic recording body. An apparatus for holographically recording and reproducing the images includes optical means to adjust the cross sectional area of a laser ray to a size appropriate to the recording body and then to direct the ray through the original film image and onto the recording body. The laser ray which passed through the film image is combined with a laser reference ray on the recording body to form a hologram. During readout of the holographically recording image, a laser ray is passed through or reflected from the hologram on the recording disc and received by a reproducing television camera. Optical means associated with the apparatus compensates for migration and jitter of the images then reproduced at the television camera so that a stable image is reproduced notwithstanding the rotation of the recording disc during picture image reproduction.

5 Claims, 13 Drawing Figures

3914544
NO OR CLASSIF

APPARATUS FOR HALOGRAPHICALLY RECORDING AND REPRODUCING PICTURE IMAGES ON A DISC

This a continuation of application Ser. No. 251,911, filed May 10, 1972.

SUMMARY OF THE INVENTION

This invention relates to a disc recording device and a disc reproducing device utilizing holograms. In recording and reproducing picture image data, methods for using holograms included one in which a relief phase hologram was pressed on a vinyl film, and another which used a disc as shown in Japanese patent application No. 39360/1971. In the former, however, not only was the cost relatively high but a long time for copying time was required. The latter method was insufficient for the present type of hologram production and reproduction.

The present invention discloses a disc storage type image recording and reproduction system having cost and good image quality, which improves the defects and insufficiencies assoicated with the prior art.

As is well known, when laser rays having good coherence and, for instance, picture images on an ordinary film was arranged along the periphery of the disc as hologram images, are considered, the object of successively taking out these reproduced images as jitterless, continuous images by the rotation of the disc can be substantially attained by making Fraunhofer's hologram. However, as the picture elements arranged on the disc obtained by the aforementioned method are generally desired to be of a small area in order to increase the quantity of recordable information, and at the same time, have uniformity in the radial direction (each picture element is recorded on a point which is displaced by a certain center angle from each other, this gives rise to the following two problems. First, substantial speckle noise in the laser reproduced images is produced when we use an ordinary scattering ray type hologram and reproduce small area images. Secondly, since picture images are reproduced which are arranged being inclined at a certain predetermined center angle, breaking due to the rotation occurs at each picture image. Since the speckle noise of the first problem can be avoided by using a simple beam in place of the scattering ray for applying the object body, the breaking due to rotation of the second problem becomes an important point of this invention. The main object of the present invention is to provide a method of solving said two problems.

BRIEF DESCRIPTION OF THE DRAWING

The accompanying drawings show one example embodying the present invention.

Figure 1:
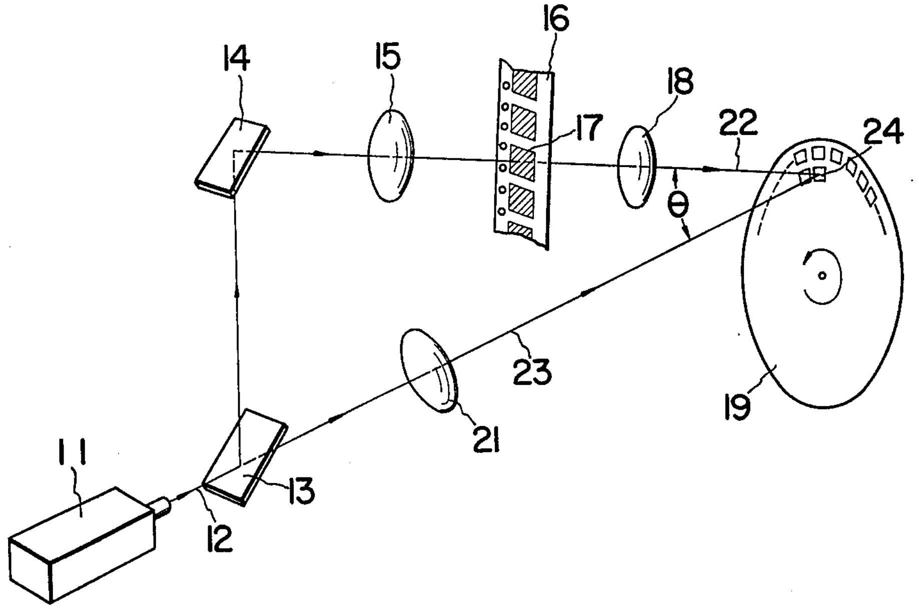
FIG. 1 is an oblique view showing a recording device according to the present invention.

In the above drawings, reference numeral 11 designates a laser ray generator; 12, a laser ray generated from said laser ray generator; 13, a beam splitter; 14, a reflection mirror; 15, 18 and 21, lenses; 16, an original picture film for recording; 17, a frame thereof; 19, a circular photograph dry-plate for recording holograms; 22, an object ray incident on the dry-plate; 23, a reference ray incident on the dry-plate; 24, a hologram corresponding to the frame 17 on the dry-plate; 19', 23', 24', respectively dry-plates, reference ray and hologram at different disc positions corresponding to 19, 23, 24; 17', a desired point of the frame 17; 25, a zero-order diffraction light (straight light) passing through the point 17', 25', 25'', primary diffraction lights generated from the point 17'; 27, a reproduction laser generator; 28, a laser ray generated from the reproduction laser generator 27; 29, 36, lenses respectively; 30, a circular hologram plate 31, one frame of reproduced hologram; 32, data light reproduced by said one frame of reproduced hologram 31; 33, a reproduced laser optical axis; 34, an arbitrarily selected point on the circular hologram plate 30; 34', 34'' respectively holograms produced by primary diffraction light generated from the point on the original picture film corresponding to the arbitrarily selected point 34; 28', a reproduced laser ray passing through said point 34; 35, a reproducing television camera; 37, a photoelectric converter within said television camera 35; 38, a beam passing through one end of said frame 31; 38', a beam corresponding to the beam 38 at the time of the migration of said frame 31 to the frame 31'; 39, a point corresponding to the beam 38 on the face plate of the photoelectric converter 37; 40, an optical axis of data light from the frame 31; 40', an optical axis corresponding to said optical axis 40 at the time when said frame 31 is moved to 31'; 41, a reproduced image corresponding to said frame 31; 42, a lens for compensating the rotation; 41', a reproduced image corresponding to 31' when there is no lens 42; 43, a curved lens compensating for the rotational error; 44, a L-shaped metal fitting; 45, a metal reflection plate; 46, 47, screws; 48, a tap metal fitting; and 49, screw.

Furthermore, $\theta$ represents an angle formed by axis 22, 23; $f_1$, a focal distance of lens 18; $f_2$, a focal distance of lens 36; O, a rotation center of the disc 30; O', migration and rotation centers of reproduced images 41, 41'; and $\phi$, an angle formed by the frames 31, 31'.

DETAILED DESCRIPTION OF THE INVENTION

One example embodying the present invention will be explained with reference to the accompanying drawings.

In FIG. 1 shown are a method of reducing speckle noises generated when images are reproduced from a small area hologram, and, at the same time, a method of recording halograms capable of obtaining jitterless continuous reproduced images from holograms successively recorded on the rotary disc.

In the drawings, reference numeral 11 designates a laser ray generator, for instance, a helium neon gas laser ray generator. Laser ray 12 generated by the laser ray generator is split by a beam splitter 13, and one is used as a reference ray and another is used as object ray. The object ray is changed in its direction by the reflection mirror 14 and converged or diffused by the lens 15 so that a picture element 17 is entirely and uniformly irradiated. The converged or diffused beam irradiates one picture element (picture surface) 17 of an object 16 to be recorded, and further by lens 18 providing a characteristic of this apparatus that each order refraction light produced at each point of the object generated by the object body 16 becomes parallel to the object ray which is irradiated on the photosensitive material applied on the cricular dry-plate 19. On the other hand, the reference ray obtained by a beam splitter 13 passes through a lens 21 and is superposed on said object ray at an irradiation position 24 of the object ray of the circular dry plate 19 thereby to form a hologram.

In FIG. 1 lenses 15 and 21 are not essential and can be omitted if the laser flux 12 has a sufficient cross sectional area to entirely and uniformly irradiate the picture element 17. Various modifications are considered for this method of forming the hologram, but they are all well-known and deemed unnecessary for the explanation of this method. It is, therefore, omitted. Further, an angle formed by the object ray and reference ray is denoted as $\theta$ for the explanation hereafter.

Figure 2:
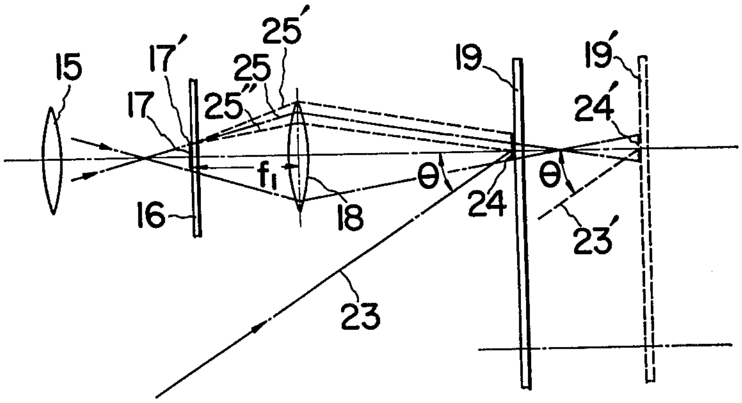
FIG. 2 is a side elevation for illustrating a part of the recording device.

In FIG. 2, the main point of FIG. 1 is further explained in detail.

Firstly, the object ray converged or diverged by lens 15 irradiates a portion designated by reference numeral 17 on the object 16. For example, a point 17' arbitrarily selected on the object will be considered.

The point 17' receives the laser ray and generates a zero-order diffraction light 25 (straight light) and primary diffraction lights 25' and 25''. Diffraction lights of more than second-order can be generated in the same manner. Each diffraction light 25, 25' generated from the point 17' becomes parallel to the O-order diffraction light 25 through lens 18 placed on a point spaced by the focal point $f_1$ from the object, and is irradiated on a part 24 on the dry-plate 19.

In this manner, images due to primary, secondary and higher order diffraction lights are superposed and irradiated at the image due to the zero-order diffraction light (straight light) corresponding to the portion 17 of the object on said position 24, and the reference ray 23 is superposed and irradiated on the entire part of these images by forming the angle $\theta$.

Furthermore, the position of the circular dry-plate 19 is selected on a point rearward from the point converged by the lens 18 as shown by dotted line as 19' so that the rays are converged and irradiated on 24 making an image. Furthermore, first order and second order diffraction lights become parallel to O-order diffraction light and are superimposed on 24. It should be evident that when we apply the reference ray 23 to the dry-plate at 19' similarly as was applied to the dry-plate at 19, a difference in principal does not occur so that the plate 19 can be positioned substantially anywhere along the optical axis of the lenses 15 and 18.

Figure 3:
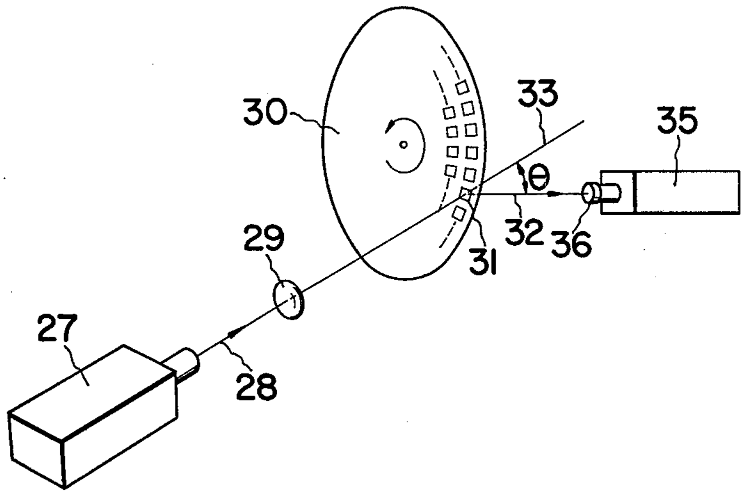
FIG. 3 is an oblique view showing a reproduction device according to the present invention.

Turning now to FIG. 3 a method of reproducing the original object images from the hologram recorded by the aforementioned methods will be hereinbelow explained.

Reference numeral 27 designates a laser ray generator having good coherence in the same manner as the laser ray generator 11. Laser ray 28 generated therefrom is changed by the collimeter lens 29 to a parallel beam having a proper diameter and a hologram 31 to be reproduced is formed on the disc 30.

Upon this occasion, by the publicly known wave surface reproduction principle an object data light 32 due to the primary diffraction light is reproduced at the same angle as $\theta$ explained in FIG. 1 with respect to recording for reproduction by the ray 28.

This data light 32 is incident on the face plate of camera tube in the camera through a lens 36 attached to a television camera 35, the object image is converted into an electrical signal and the object image is reproduced on a television monitor.

Then, how the influence on the hologram due to high order diffraction light recorded at the time of image transcription can be eliminated from the obtained reproduced images will be shown hereinbelow.

Figure 4:
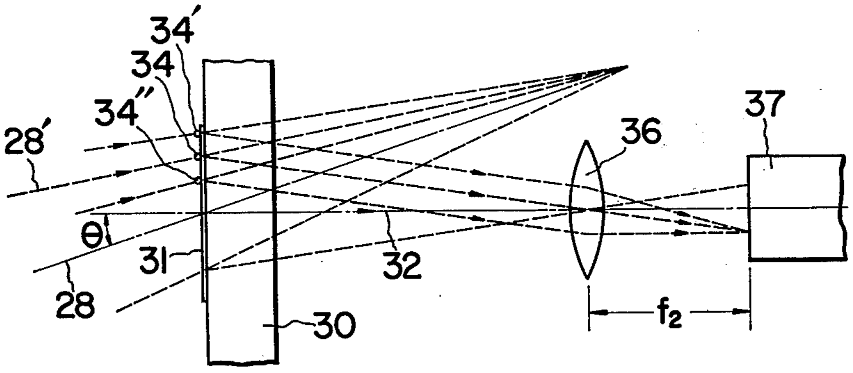
FIG. 4 is a side elevation for explaining the image of high order diffractive light.

In FIG. 4, assume that the center of the reproduction beam is designated by a reference numeral 28, the beam is incident and inclined at the angle $\theta$ with respect to the normal direction of the hologram and therefore the primary diffraction light of the beam 28 takes the light path 32, and reaches the camera tube 37 through the lens 36.

On the other hand, the high order diffraction image corresponding to hologram an arbitrarily selected point 34 obtained at the time of recording are considered to be at 34', 34'' etc.

According to the foregoing recording conditions, in the case where the angle of the reproduced light is similar to that of the reference ray incident upon the circular dry-plate at the recording time, the diffraction light of the reproduced beam obtained by holograms of these high order diffracted images and diffraction light of the reproduced beam obtained by O-order diffraction hologram images corresponding to 34 are directed toward the lens 36 as a parallel beam.

However, since the distance between the lens 36 and the face plate of camera tube 37 is selected to be equal to the primary focal length $f_2$ of lens 36, the beam passing through points 34, 34', 34'' are converged at a point on the face plate, and all order diffraction light can be imaged to form a reproduced image.

Furthermore, since in the aforementioned method no diffusion plate is used, no noise based on diverging unevenness is generated nor partial collection of data light on the dry-plate occurs, thus deterioration of image being prevented.

Figure 5:
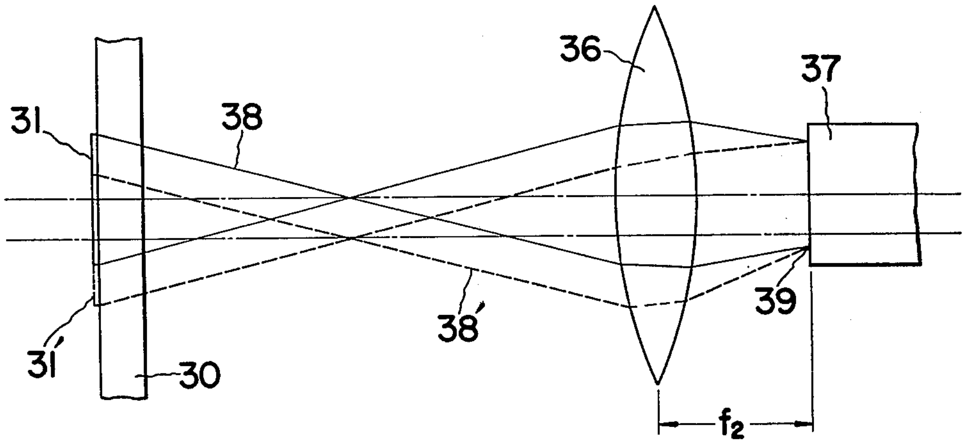
FIG. 5 is a side elevation for explaining the compensation for the migration of the hologram.

Furthermore, the principal that in FIG. 5, even in the case where the hologram image has shifted in the horizontal and vertical directiion, has the reproduced image is fixed on the face plate of camera tube 37, will be explained. In FIG. 5, an arbitrarily selected frame 31 on the hologram disc 30 will now be considered.

For instance, the reproduction been irradiated on the frame 31 is subjected to diffraction as explained in FIG. 4 and images are formed as ordinary images i.e., not holograms, on the tube surface of camera tube 37 by lens 36.

Let us assume that the disc 30 shifts horizontally and vertically and the frame 31 is displaced to 31'. Upon this occasion, if the same type of reproduced light is used as with the frame 31 as in FIG. 4, the primary diffraction light beam by high order diffraction is projected as a parallel beam. For example, a beam 38 passing through one end of the frame 31 and a beam 38' passing through one end corresponding to the end of the frame 31' after displacement become parallel to each other, accordingly it is apparent that images are formed on the same point 39 since the parallel beams converge thereat.

Thus, the influence of horizontal and vertical movement caused by the hologram plate 30 becomes insignificant at the camera tube surface, and therefore each frame can be reproduced as continuous jitterless images. It can be said that this mechanism has effects equivalent to those due to a disc driving mechanism and shutter of an ordinary projector that is, an ordinary projector losses synchronism with the film images, the images projected onto a screen will flutter or jitter.

However, when the image recording plate having halograms is considered, holograms corresponding to each frame are successively arranged in spiral shape and they are reproduced by the aforementioned reproduction device. The movement of the hologram image not only includes the displacement of the horizontal and vertical components but also an angular displacement with respect to the hologram center is added.

Figure 6:
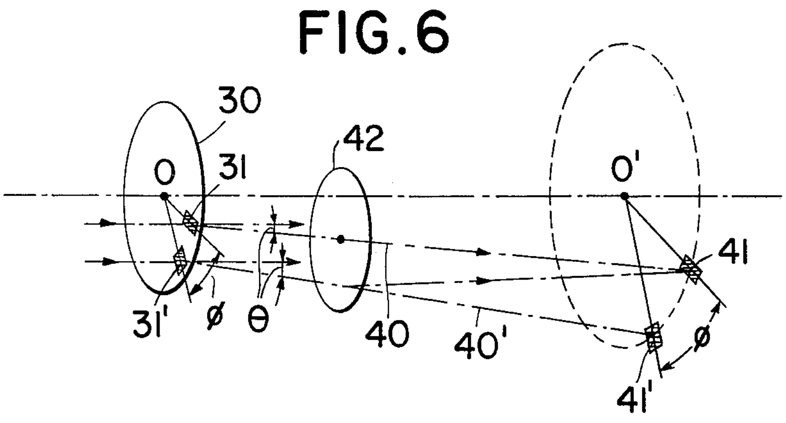
FIG. 6 is an oblique view for explaining the compensation for the rotation of the hologram.

The displacement of the image forming position on the camera tube surface due to the displacement of the angle is shown in FIG. 6.

More specifically, the same reproduction beam irradiated on holograms 31, 31' of an arbitrary, continuous picture element on the hologram plate 30 is diffracted and becomes axis 40, 40'. Now, when no lens is considered, holograms 31 and 31' all separated by a center angle of $\phi$ with respect to the core of disc 30, and therefore the reproduced image on the camera pickup surface is displaced in an arc shape having a center 0' which is an intersecting point of the center axis O—O' of the circular disc 30 on a plane containing the camera pickup surface, a radium of the distance between an image forming position on the camera pickup surface and the point 0', and a center angle of $\phi$ which is made by hologram 31, 31', and becomes image forming positions 41, 41'.

Now, we provide a lens 42 making its center axis common with the axis of the beam 40 and the lens can draw back the image 41 to 41' as shown in FIG. 6 and can minimize the displacement of the imaging position caused by rotation, that is, the residual jitter of reproduced images can be minimized.

In this case, we can provide the camera pickup surface at the rear forcus point of the lens 42 to minimize the displacement of imaging position by rotation, and at the same time can satisfy the imaging condition of the high-order diffraction rays as shown in FIG. 4. As a result, we can use one lens to provide the function of the lens 36 in FIG. 5 together with that of the lens 42 in FIG. 6.

Figure 7A:
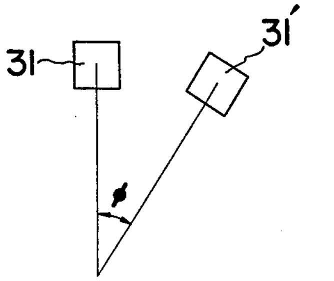
FIG. 7 (A) and (B) are views showing the compensation method shown in FIG. 6.
Figure 7B:
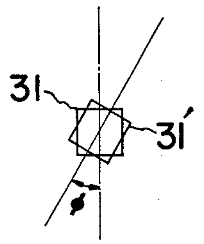

In FIG. 6, when the beams 40, 40' are completely parallel, the images 41 and 41' becom common by the lens 42 except for some displacement caused by a small rotation around the center of the picture, as shown in FIGS. 7A, 7B. FIG. 7(A) shows the displacement of an image on the camera pickup surface where there is not the lens 42 in FIG. 6, and FIG. 7(B) shows when there is the lens 42.

Figure 8:
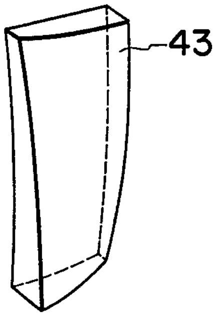
FIG. 8 is an oblique view showing a curved lens for compensating the rotational error.
Figure 10:
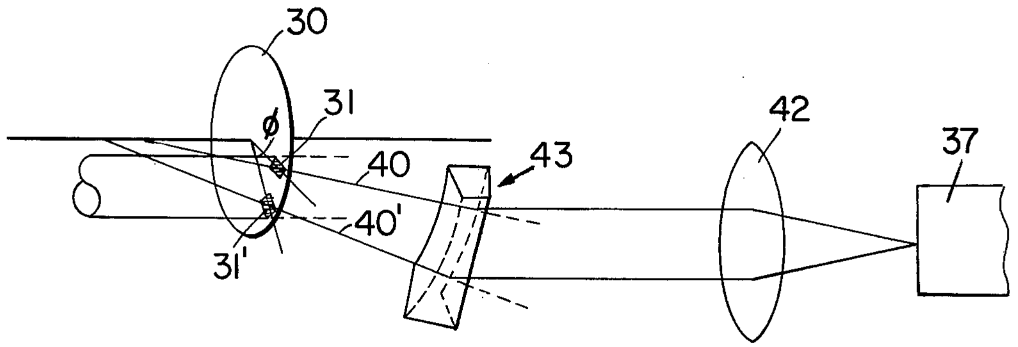
FIG. 10 is an oblique view showing the position of a precompensating lens.

But, as it is clear from geometric optics, the beams 40 and 40' have a small different angle and so the condition in FIG. 7 (B) contains, besides a rotation component $\phi$ an effect of horizontal and vertical residue displacement. We must cancel both of the errors when we make high quality pictures. For this purpose, we can use a bent lens equivalent body 42 as shown in FIG. 8. This compensating lens is settled between the circular hologram disc 30 and the lens 42 as shown in FIG. 10 to make the condensing point of the reproduced O-order diffraction ray common to the compensating lens surface. The compensating lens 43 is designed so that its angle of refraction to the beam moves to 40' by rotation of the circular disc 30. Now, when the disc 30 rotates, the condensing point is displaced by the rotation making the passing position through the compensation lens change continuously. As shown in FIG. 6 the small angle difference of the beam 40 and 40' can be compensated to become parallel beams applied to the lens 42 by the compensating lens 43, and at the same time the rotation component in FIG. 7 (B) is compensated.

As a result, we can design a compensating lens which can eliminate almost all residue jitter.

However, as the high-order diffraction rays do not condense at the above mentioned position of the compensating lens, but are distributed in a small area, the condition mentioned herewith becomes rather different from the imaging condition of high-order diffraction rays shown in FIG. 4.

We can minimize the difference of imaging condition by making an optical pre-compensation for the applied light at the dry plate when the hologram is made.

The quantity of this pre-compensating can be determined from mathematical analysis, but practically it is determined conveniently by simulation by eliminating the hologram dry plate.

That is, eliminating the reference ray and the dry plate in FIG. 1 we set at the position of 24 the bent compensating lens 43, the lens 42 and the camera pickup 37 at the same position as that during the hologram reproduction, and we may control the position of the lens 18 in FIG. 2 to make the high-order diffraction rays of the image on the monitor condense as the reproduced image of the object. Thus, we can reproduce the image of a hologram row circular dry plate without any practical problem.

The explanation which has been mentioned in the foregoing has been made with regard to refracted light, but the object may be easily attained by the utilization of reflected light using a mirror rather than the lens 43.

Figure 11:
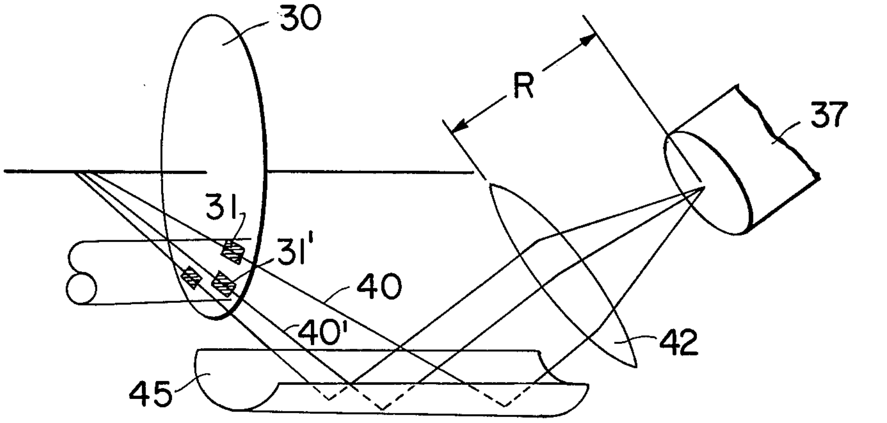
FIG. 11 is an oblique view showing the position of the reflection device in FIG. 9.

This will be apparent from a fact that convex and concave lenses correspond to convex and concave mirror and the bent lens such as 43 is equivalent to the reflection surface having a certain curvature. For example, curved reflection 45 in FIG. 11 is such a reflector means by way of example. The reflector 45 is arranged between the circular disc 30 and the lens 42. The center axes 40 and 40' of the reproducing beam from the hologram 31 and 31' reflected at the mirror surface 45 becomes parallel to each other and are projected in the lens 42 and condensed at a point in the camera tube 37 arranged at a distance $r$ from the lens 42.

Figure 9A:
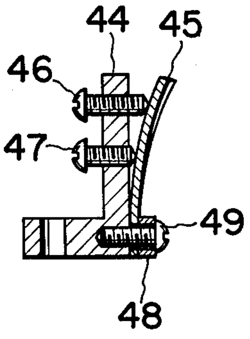
FIG. 9 (A) and (B) are a sectional view and a front elevation respectively showing one example of a reflection device for compensating the migration and the rotation.
Figure 9B:
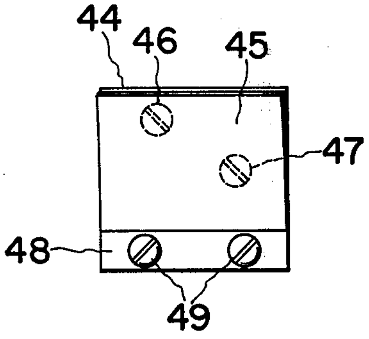

One example of said reflection means is shown in FIGS. 9 (A) and (B).

More specifically, FIG. 9 (A) shows the cross section of this reflection means wherein a curved surface is produced on the metal reflection plate 45 (a metal plate etc. having a mirror surface used in a ferro-type) by means of two screws 46 and 47 fitted to a L-shaped metal fitting 44. The metal plate 45 is firmly fitted to the bottom of the L-shaped metal fitting 44 means of a tap metal fitting 48 and a screw 49.

Accordingly, the curvature of the plate can be adjusted by adjusting screws 46 and 47. This reflecting apparatus can be used in place of the bent lens 43 in FIG. 8, but it is necessary to make common the optical axis of the following reproducing system corresponding to the direction of the ray passed through the reflector.

In this adjustment method, it is, of course, preferable to vary the fitting angle and the curvature of the plate so that the migration of the image becomes smallest upon the reproduction of the image. According to the experiment, it is acknowledged the element of the aforementioned image transfer is easily compensated by this means. FIG. 9 (B) is a front elevation showing this reflection means.

The improvement and the increase of stability in the picture quality of the recording reproduction device due to holograms which have heretofore been put into question can be obtained at low costs and by use of the method of separating the color multiplex signal thereby to provide a recording plate of color images. The example, in the case when guide transmission diffracted light generated at the time reproduction beam passing respective holograms 31 on the recording disc into camera and reproduce picture images, has been explained heretofore. As the other method, picture images can be obtained utilizing reflection light from holograms 31 and there is needless to say that in this case the present invention can be applied in the same manner.

A few examples embodying the present invention have been explained as the foregoing. However, it will be understood that a number of modifications may be possible without departing from the spirit of the present invention as shown in claims in the dimension ratio and the arrangement of each part.

What we claim is:

1. A device for reproducing picture images utilizing holograms comprising:

a laser ray generator;

lens means which adjusts the cross sectional area of a laser ray generated therefrom as an object ray and directs said laser ray to impinge upon a holographic recording disc;

a curved reflection plate for correcting a rotation error caused by a rotation of said recording disc, said reflection plate having a plurality of adjusting screws at a rear surface thereof and performing said correction by reflecting said object ray produced by said laser ray impinging upon said recording disc; and a television camera which receives said reflection ray, said television camera being provided with a face plate of a camera pickup tube positioned to the rear of a television camera lens at a distance of the prime focal length of said television camera lens.

2. In a system of disc reproducing picture images utilizing holograms wherein frame images are arranged as respective holograms along a disc-shaped path on a disc shaped recording body;

means for reproducing picture images utilizing holograms comprising optical means to condense the diffraction rays produced by a read-out laser ray passing a respective frame of the holograms; and means for compensating for migration of an image reproduced at a photoelectric conversion portion of a television camera caused by the rotation of said disc-shaped hologram recording body.

3. In a system of disc reproducing picture images utilizing holograms wherein frame images are arranged as respective holograms along a spiral-shaped path on a disc shaped recording body;

means for reproducing picture images utilizing holograms comprising optical means to condense the diffraction rays produced by a read-out laser ray passing a respective frame of the holograms; and mean for compensating for migration of an image reproduced at a photoelectric conversion portion of a television camera caused by the rotation of said disc-shaped hologram recording body.

4. In a system of disc reproducing picture images utilizing holograms wherein frame images are arranged as respective holograms along a disc-shaped path on a disc-shaped recording body;

means for reproducing picture images utilizing holograms comprising optical means to condense reflected diffraction rays produced by a readout laser ray reflected from a respective frame of the holograms on a recording plate at a camera pickup photoelectric conversion portion of a television camera; and means for compensating for a migration of an image reproduced at said photoelectric conversion portion caused by the rotation of said disc-shaped hologram recording body.

5. In a system of disc reproducing picture images utilizing holograms wherein frame images are arranged as respective holograms along a spiral-shaped path on a disc-shaped recording body;

means for reproducing picture images utilizing holograms comprising optical means to condense reflected diffraction rays produced by a readout laser ray reflected from a respective frame of the holograms on a recording plate at a camera pickup photoelectric conversion portion of a television camera; and means for compensating for a migration of an image reproduced at said photoelectric conversion portion caused by the rotation of said disc-shaped hologram recording body.

* * * * *

UNITED STATES PATENT AND TRADEMARK OFFICE

CERTIFICATE OF CORRECTION

PATENT NO. : 3914544

DATED : October 21, 1975

INVENTOR(S) : Hideo Watanabe et al

It is certified that error appears in the above-identified patent and that said Letters Patent are hereby corrected as shown below:

Priority date to be listed as:

--November 15, 1971 Japan .............46-90582--

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*